(12) United States Patent
Hao

(10) Patent No.: US 11,440,199 B2
(45) Date of Patent: Sep. 13, 2022

(54) ROBOTIC SERVICE SYSTEM IN RESTAURANTS

(71) Applicant: Gang Hao, Corona, CA (US)

(72) Inventor: Gang Hao, Corona, CA (US)

( * ) Notice: Subject to any disclaimer, the term of this patent is extended or adjusted under 35 U.S.C. 154(b) by 545 days.

(21) Appl. No.: 16/445,119

(22) Filed: Jun. 18, 2019

(65) Prior Publication Data

US 2020/0398437 A1 Dec. 24, 2020

(51) Int. Cl.
*B25J 11/00* (2006.01)
*B25J 9/16* (2006.01)
*B25J 9/00* (2006.01)

(52) U.S. Cl.
CPC ......... *B25J 11/0045* (2013.01); *B25J 9/0093* (2013.01); *B25J 9/162* (2013.01)

(58) Field of Classification Search
CPC ...... B25J 11/0045; B25J 9/0093; B25J 9/162; B25J 5/00; B25J 9/0087; B25J 11/008
USPC .......................................................... 700/245
See application file for complete search history.

(56) References Cited

U.S. PATENT DOCUMENTS

| | | | | |
|---|---|---|---|---|
| 9,535,421 | B1* | 1/2017 | Canoso | G05D 1/0248 |
| 9,720,414 | B1* | 8/2017 | Theobald | B25J 11/008 |
| 10,482,550 | B1* | 11/2019 | Theobald | B25J 11/008 |
| 10,716,192 | B1* | 7/2020 | Tsibulevskiy | H02J 7/025 |
| 11,169,666 | B1* | 11/2021 | Sokolowski | G06F 40/14 |
| 2007/0239315 | A1* | 10/2007 | Sato | B25J 9/1612 |
| | | | | 700/245 |
| 2012/0061155 | A1* | 3/2012 | Berger | B25J 5/007 |
| | | | | 180/21 |
| 2012/0325624 | A1 | 12/2012 | Tanaka | |
| 2013/0317642 | A1* | 11/2013 | Asaria | G06Q 10/08 |
| | | | | 700/216 |
| 2016/0059412 | A1* | 3/2016 | Oleynik | B25J 13/02 |
| | | | | 700/257 |
| 2017/0011580 | A1* | 1/2017 | Huang | G06Q 30/0639 |
| 2017/0087724 | A1 | 3/2017 | Doll | |
| 2017/0178938 | A1* | 6/2017 | Minami | B25J 18/025 |
| 2018/0243922 | A1 | 8/2018 | Hashimoto et al. | |
| 2018/0249861 | A1* | 9/2018 | Hiatt | A23L 5/10 |
| 2019/0047838 | A1* | 2/2019 | Mack | G06Q 10/043 |
| 2019/0176338 | A1* | 6/2019 | Zito | G06Q 50/12 |
| 2019/0337152 | A1* | 11/2019 | Homberg | B25J 9/1664 |
| 2020/0054175 | A1* | 2/2020 | Roy | B25J 11/0045 |
| 2020/0238534 | A1* | 7/2020 | Goldberg | B25J 9/0093 |

(Continued)

FOREIGN PATENT DOCUMENTS

| | | |
|---|---|---|
| CN | 204893933 U | 12/2015 |
| CN | 106584468 A | 4/2017 |
| CN | 108715336 A | 10/2018 |

(Continued)

OTHER PUBLICATIONS

CN106584468.translate (Year: 2017).*
CN204893933.translate (Year: 2015).*

*Primary Examiner* — B M M Hannan
(74) *Attorney, Agent, or Firm* — Lewis Roca Rothgerber Christie LLP

(57) ABSTRACT

A system for serving a plate on a table includes a robot including a movable base, a body on the movable base, a first pair of arms connected to the body and including a first arm and a second arm; and a first plate holder including a first and second connectors, the first and second connectors to engage the first and second arms, respectively.

18 Claims, 17 Drawing Sheets

(56) References Cited

U.S. PATENT DOCUMENTS

2020/0290210 A1* 9/2020 Ha ...................... B25J 11/0045

FOREIGN PATENT DOCUMENTS

| CN | 109015697 | A |   | 12/2018 |
|----|-----------|---|---|---------|
| CN | 109108995 | A |   | 1/2019  |
| JP | 2019-10693 | A |   | 1/2019  |
| KR | 20100110143 | A | * | 10/2010 |

* cited by examiner

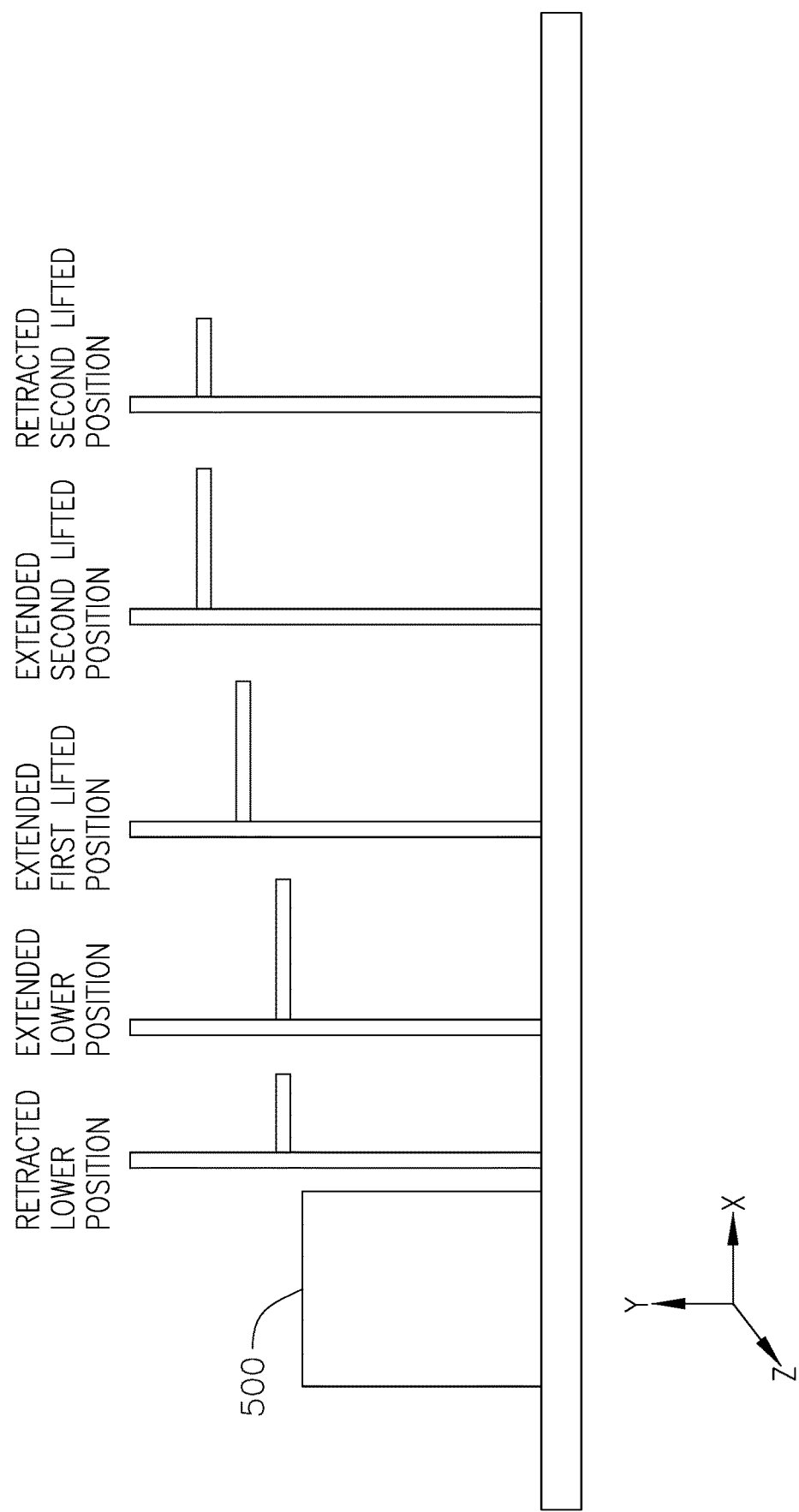

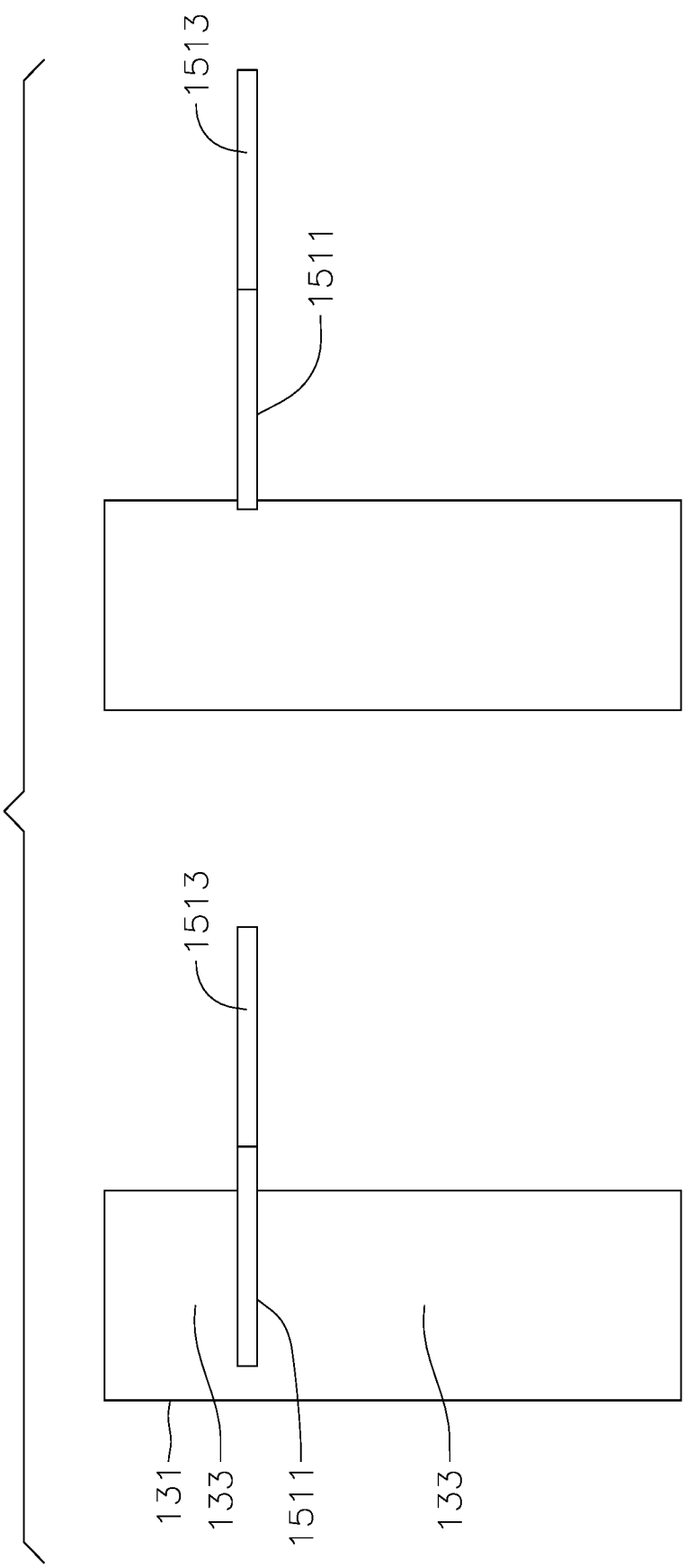

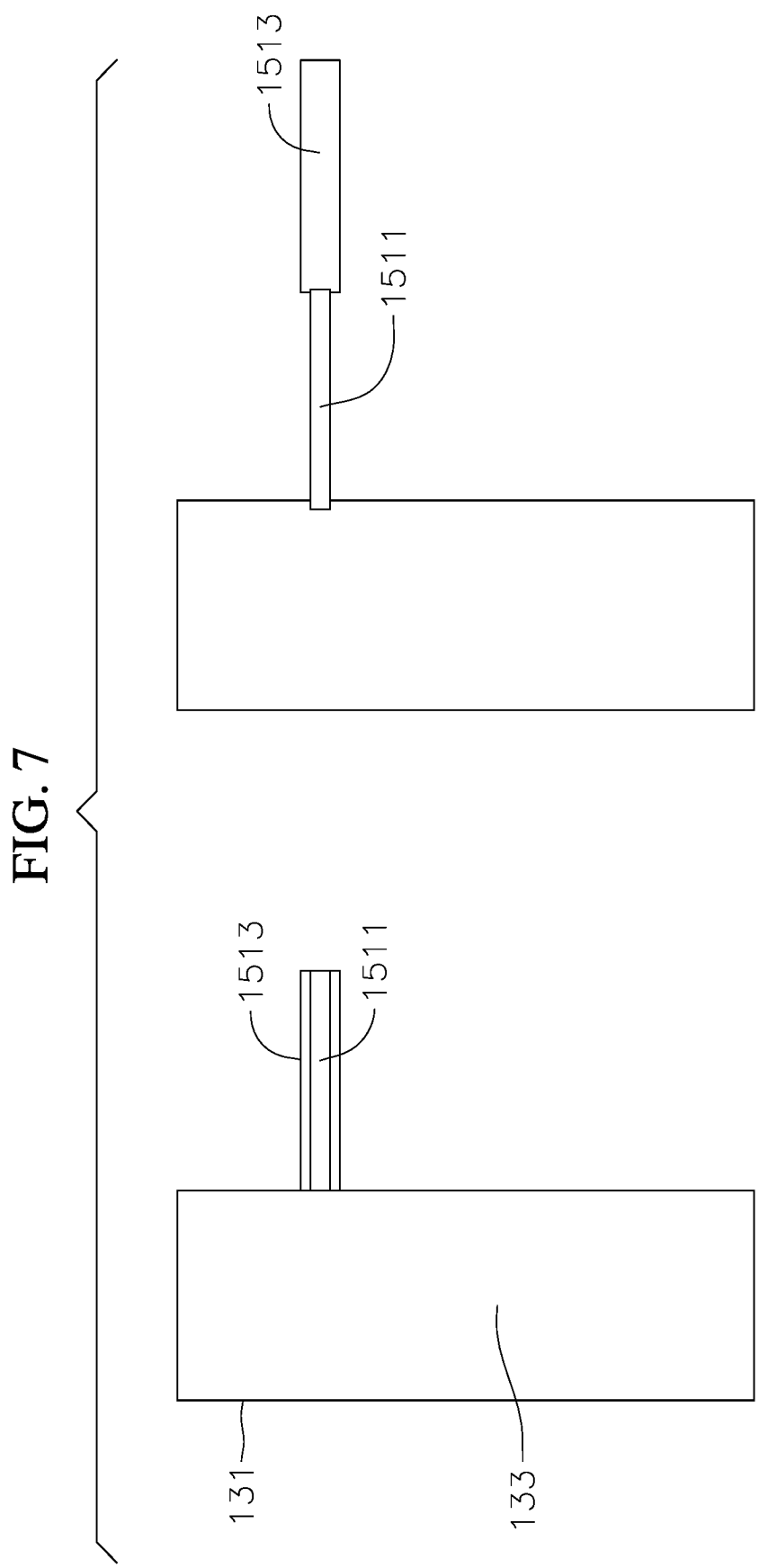

ROBOTIC SERVICE SYSTEM IN RESTAURANTS

FIELD

The present disclosure relates generally to a robotic service system for serving dishes in a restaurant and a method of utilizing the same.

BACKGROUND

Some level of automation has been utilized in restaurants, such as sushi dishes transported on a conveyer system where the customer is to pick up a selected dish from the conveyer system.

There is a need for a robotic service system that can place the dish directly on the table in front of the customer.

The above information in the Background section is only for enhancement of understanding of the background of the technology and therefore it should not be construed as admission of existence or relevancy of the prior art.

SUMMARY

According to an embodiment of the present disclosure, a system for serving a plate on a table includes: a robot including a movable base, a body on the movable base, and a first pair of arms connected to the body and including a first arm and a second arm spaced apart from the first arm, the first pair of arms configured to complete one or more actions of raising, extending, lowering, and withdrawing to reach at least one position selected from a retracted lower position, an extended lower position, an extended first lifted position, an extended second lifted position, and a retracted second lifted position; and a first plate holder including a first connector and a second connector spaced apart from the first connector, the first and second connectors to engage the first and second arms, respectively.

In one embodiment, the first and second connectors each have an opening to accommodate the respective first and second arms.

In one embodiment, the first and second connectors each have a top edge to engage with the respective first and second arms.

In one embodiment, the plate holder has a side surface, and the first connector is located on a first portion of the side surface and the second connector is located on a second portion of the side surface opposite to the first portion of the side surface.

In one embodiment, the plate holder has a base portion and a top portion on the base portion, a surface of the top portion overlaps with and extends over a surface of the base portion, and the first connector and the second connector are located on the surface of the top portion that extends over the surface of the base portion.

In one embodiment, the plate holder has a base portion and a top portion on the base portion, the first and second connectors are each an opening extending vertically on the base portion, each opening has a top edge, and the first and second arms are to engage with the top edge of the respective opening in the extended first lifted position.

In one embodiment, the plate holder and the plate are integrally formed together, and the plate holder has an upper surface defining an interior of the plate to receive food.

In one embodiment, the top portion is to accommodate the plate.

In one embodiment, the top portion has a concave top surface extending toward the bottom portion to accommodate the plate.

In one embodiment, the first plate holder further includes a bottom cover facing the top surface.

In one embodiment, the top surface includes a hole in a middle thereof, the bottom cover is configured to accommodate a heater, and the heater is to heat the plate through a hole of the top cover.

In one embodiment, the system further includes a table to receive the plate, wherein a top surface of the table has substantially the same height as a bottom surface of the first plate holder when the first and second arms are in the extended first lifted position.

In one embodiment, a height of the first pair of arms in the extended lower position is higher than the top surface of the table.

In one embodiment, the first plate holder has a rectangular box shape.

In one embodiment, at least a portion of the first plate holder has a curved shape.

In one embodiment, the body has a chamber surrounded by a vertical plate and a back plate, each of the first and second arms includes a first segment and a second segment connected to the first segment, wherein in the retracted lower position, the first segment is inside the chamber and the second segment is outside the chamber, and in the extended lower position, both the first and second segments are outside the chamber.

In one embodiment, the first and second arms each include a second segment having a hollow core and a first segment between the second segment and the body of the robot, wherein in the retracted lower position, at least a portion of the first segment is inside the hollow core of the second segment, and in the extended lower position, the first segment is outside the hollow core of the second segment.

In one embodiment, the system further includes a plurality of plate holders, and the robot includes a plurality pairs of arms, each pair of arms including a first arm aligned vertically with other first arms, and a second arm aligned vertically with other second arms, each pair of arms configured to engage with a plate holder of the plurality of plate holders.

In one embodiment, the system further includes a first endless conveyer belt connected to each of the plurality of first arms and a second endless conveyer belt spaced apart from the first endless conveyer belt, the second endless conveyer belt connected to each of the plurality of second arms, wherein each pair of arms is to be conveyed between a plurality of positions between a topmost position and a lowermost position vertically.

In one embodiment, the robot further includes a processor and a display, wherein a user is to input a position of the table through the display, and the processor is to control movement of the movable base and the first pair of arms.

According to an embodiment of the present disclosure, a method of serving a plate on a table includes moving a robot to a spot adjacent to the table, the robot carrying a plate holder, and the plate holder having the plate thereon, wherein the plate holder includes a first connector and a second connector spaced apart from the first connector, wherein the robot includes a movable base, a body on the movable base, and a first pair of arms connected to the body and including a first arm and a second arm spaced apart from the first arm, the first pair of arms configured to complete one or more actions of raising, extending, lowering, and withdrawing to reach at least one position selected from a retracted lower position, an extended lower position, an extended first lifted position, an extended second lifted position, and a retracted second lifted position, wherein the first and second arms are engaged with the first and second connectors during the moving of the robot. The method further includes extending the first and second arms to the extended second lifted position, the plate holder over a surface of the table; moving the first and second arms to the extended first lifted position, the plate holder being placed on the table; moving the first and second arms to the extended lower position to disengage from the first and second connectors; and retracting the first and second arms to the retracted lower position.

In one embodiment, the plate holder has a base portion and a top portion on the base portion, the first and second connectors are each an opening extending vertically on the base portion, each opening has a top edge, and the first and second arms are to engage with the top edge of the respective opening in the extended first lifted position.

In one embodiment, the plate holder and the plate are integrally formed together, and the plate holder has an upper surface defining an interior of the plate to receive food.

In one embodiment, the top portion has a concave top surface extending toward the bottom portion to accommodate the plate.

In one embodiment, the method further includes prior to the moving of the robot, picking up the plate holder, wherein the picking up of the plate holder includes: moving the first and second arms into the extended lower position, the first and second arms adjacent to or inside the first and second connectors of the plate holder in the extended lower position, moving the first and second arms to the extended first lifted position to engage with the first and second connectors of the plate holder, moving the first and second arms to the extended second lifted position, the plate holder being held horizontally by the first and second arms, and retracting the first and second arms to the retracted second lifted position.

In one embodiment, the robot includes a plurality pairs of arms including a plurality of first arms and a plurality of second arms, each pair of arms including a first arm aligned vertically with other first arms, and a second arm aligned vertically with other second arms, each pair of arms configured to engage with a plate holder of a plurality of plate holders.

In one embodiment, the robot further includes a first endless conveyer belt connected to each of the plurality of first arms and a second endless conveyer belt spaced apart from the first endless conveyer belt, the second endless conveyer belt connected to each of the plurality of second arms.

In one embodiment, each of the first and second endless conveyer belts have a first long side closer to a center of the body, and a second long side further away from the center of the body, wherein the method further includes after retracting the first and second arms of a first pair of arms of the plurality of pairs of arms in a topmost position to the retracted lower position, moving the first and second arms of the first pair of arms to the second long side of the respective first and second endless conveyer belts, and moving a second pair of arms under the first pair of arms to the topmost position.

In one embodiment, the robot further includes a speaker, and the method further includes announcing a message prior to extending the first and second arms to the extended second lifted position.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 3 is a schematic illustration of the relative position and length of each of the positions the robot arms have.

FIG. 6 is a schematic illustration of a configuration of the first and second arms.

FIG. 7 is a schematic illustration of a configuration of the first and second arms.

DETAILED DESCRIPTION

Figure 1A:
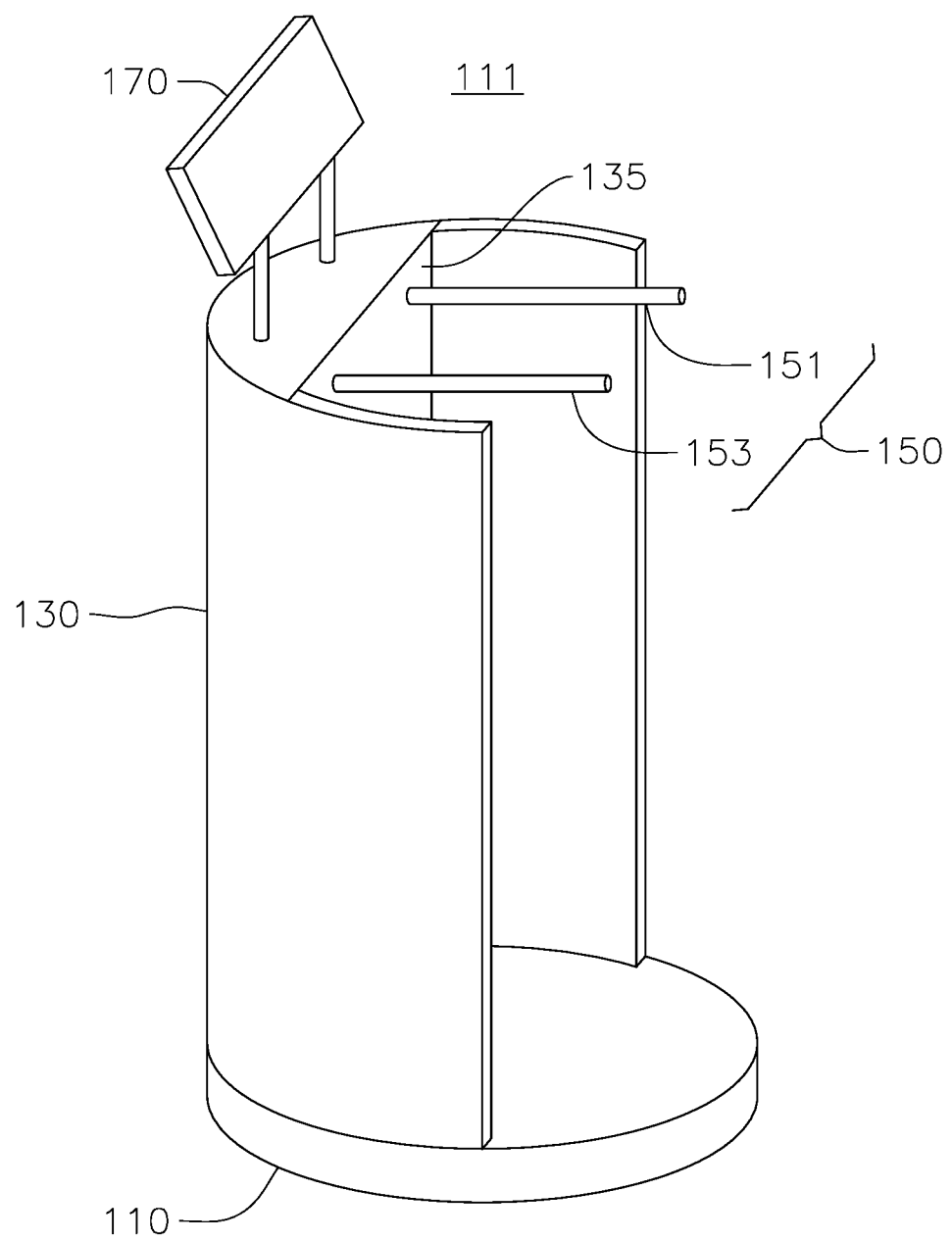
FIGS. 1A-1E are a schematic illustration of a system for serving a plate on a table according to an embodiment of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s)

as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "includes," "including," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Moreover, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, or 35 U.S.C. § 112(a), and 35 U.S.C. § 132(a).

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

According to an embodiment of the present disclosure, a system for serving a plate on a table includes a robot including a movable base, a body on the movable base, a first pair of arms connected to the body and including a first arm and a second arm spaced apart from the first arm, the first pair of arms configured to complete one or more actions selected from raising, extending, lowering, and withdrawing to reach at least one position selected from a retracted lower position, an extended lower position, an extended first lifted position, an extended second lifted position, and a retracted second lifted position; and a first plate holder including a first connector and a second connector spaced apart from the first connector, the first and second connectors to engage the first and second arms, respectively.

The first and second connectors may be suitably shaped such that they can engage with the first and second arms to stably transport the plate holder to the table. For example, the first and second connectors may be in the shape of handle bars (similar to or substantially the same as those on the pots and pans), fixtures utilized for connecting two parts together, etc., which the first and second arms can be inserted into, wrap around, or simply be in contact with from underneath the first and second arms.

In one embodiment, the first and second connectors each have an opening to accommodate the respective first and second arms. In one embodiment, the first and second connectors each have a top edge to engage with the respective first and second arms.

Similarly, the first and second arms may be suitably shaped such that they can engage with the first and second connectors to stably transport the plate holder to the table. For example, the first and second arms may be in the shape of straight sticks, sticks with a hook at the end thereof, a hand-shaped fixture with or without the ability to close around the first and second connectors, etc.

In one embodiment, the plate holder has a side surface, and the first connector is located on a first portion of the side surface and the second connector is located on a second portion of the side surface opposite to the first portion of the side surface. In one embodiment, at least a portion of the side surface has a curved shape.

In one embodiment, the plate holder has a base portion and a top portion on the base portion, a surface of the top portion overlaps with and extends over a surface of the base portion, the first connector and the second connector are located on the surface of the top portion that extends over the surface of the base portion.

In one embodiment, the plate holder has a base portion and a top portion on the base portion, the first and second connectors are each a slit extending vertically on the base portion, each slit has a top edge and optionally a bottom edge facing the top edge, and the first and second arms are to engage with the top edges of the slits in the extended first lifted position.

In one embodiment, the plate holder and the plate are integrally formed together, and the plate holder has an upper surface defining an interior of the plate to receive food. The upper surface may have a concave shape extending towards a bottom of the plate holder.

In one embodiment, the top portion of the plate holder is to accommodate the plate. The top portion may have a concave top surface extending toward the bottom portion to accommodate the plate.

In one embodiment, the plate holder may include a first and a second end walls facing each other, a first and a second side walls facing each other and each crossing the first and second end walls, and a top cover, wherein the first and second end walls, the first and second side walls and the top cover together define an interior space, the first end wall includes a first opening and a second opening spaced apart from the first opening, the first and second openings to accommodate the first and second arms, respectively, and a contact bar in the interior space to engage with the first and second arms during the transporting of the plate holder. The top cover has a concave shape extending toward the interior space to accommodate the plate.

FIGS. 1A-1E and 2A-2B are schematic illustrations of a system for serving a plate on a table.

Referring to FIGS. 1A-1E and 2A-2B, a system 100 for serving a plate on a table includes a robot 111 including a movable base 110, a body 130 on the movable base 110 and having a vertical plate 135, a first pair of arms 150 connected to the body 130 and including a first arm 151 and a second arm 153 spaced apart from the first arm 151, the first pair of arms 150 configured to complete one or more actions selected from raising, extending, lowering, and withdrawing to reach at least one position selected from a retracted lower position, an extended lower position, an extended first lifted position, an extended second lifted position, and a retracted second lifted position. Here, the retracted position and the extended position refer to positions of the pair of robot arms in the horizontal direction, e.g., the X axis direction, and the lower position, the first lifted position and the second lifted position refer to the positions of the pair of robot arms in the vertical direction, e.g., the Y axis direction. FIG. 3 is a schematic illustration of the relative position and length of the first pair of arms in each of these positions.

The retracted position and the extended position refer to the state of the robot arms along the horizontal direction. For example, in the retracted position, the first and second arms may be about 20 mm to 50 mm long along the horizontal direction (i.e., X axis direction). In the extended position, the first and second arms may be about 40 mm to 100 mm long. The lower position, the first lifted position and the second lifted position refer to the state of the robot arms along the vertical direction. For example, the first lifted position may be about 0.3 to 10 mm higher than the lower position along the vertical direction (i.e., Y axis direction), and the second lifted position may be about 0.1 to 50 mm higher than the first lifted position along the vertical direction. Also, the lower position may be higher than the height of the table 500 where the plate is to be placed on.

The movable base may have an upper end coupled to the lower end of the body and a lower end coupled to a movable member configured to allow the robot to move horizontally.

The system may further include a first plate holder 120 including a first connector 1211 and a second connector 1212. The first and second connectors may have openings 1411 and 1412 to engage with the first and second arms of the robot to allow stable transportation of the plate. FIGS. 1B to 1E show various embodiments of the plate holder.

Figure 1B:
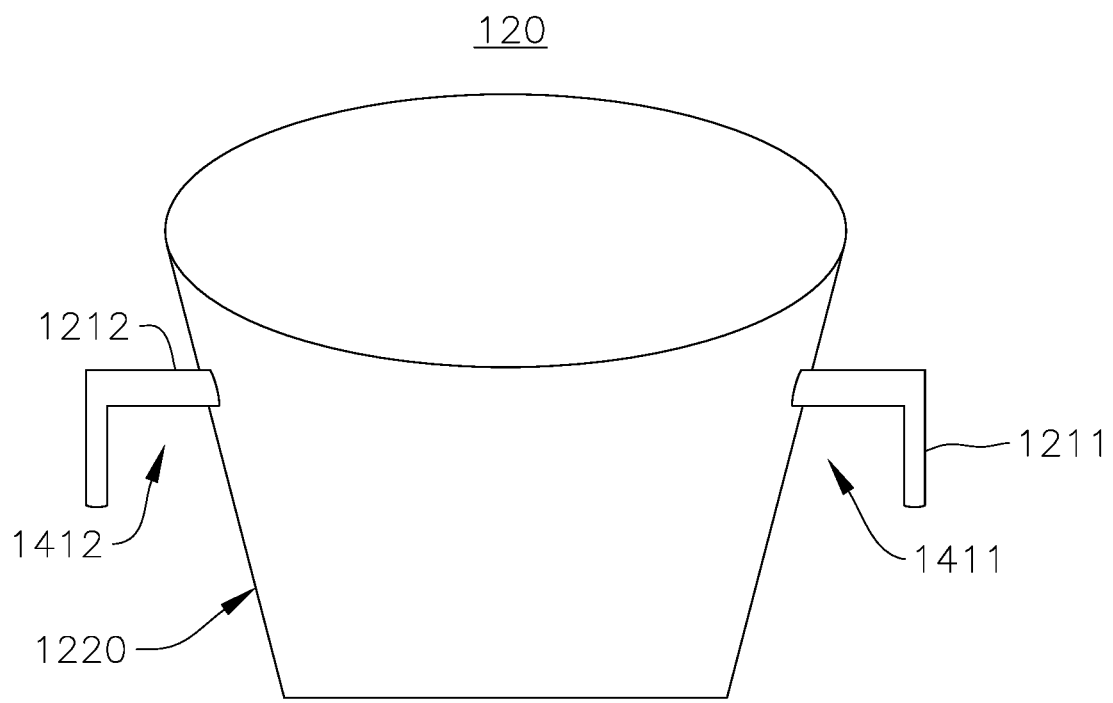

Referring to FIG. 1B, the plate holder 120 has a side surface 1220, and the first connector 1211 is located on a first portion of the side surface 1220 and the second connector 1212 is located on a second portion of the side surface 1220 opposite to the first portion of the side surface. During the transportation of the plate, the first and second arms are placed under (e.g., inside the first and second openings 1411 and 1412 respectively) and in contact with the first and second connectors 1211 and 1212 to carry the plate holder. Hereinafter, the terms "upper", "lower", "upward", "downward", "top", "bottom", "above" and "under" refer to the relative positions of the surfaces, portions, parts or elements in the vertical direction, e.g., the Y axis direction, when the robot and/or the plate holder is in the upright position.

Figure 1C:
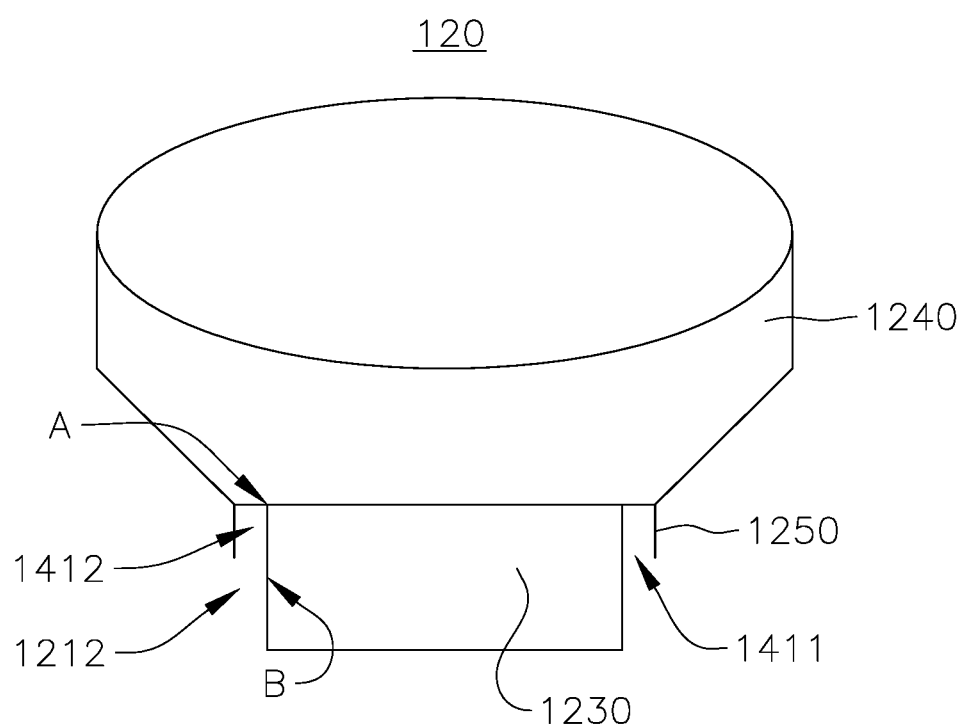

Referring to FIG. 1C, the plate holder 120 has a base portion 1230 and a top portion 1240 on the base portion 1230, a surface A of the top portion overlaps with and extends over a surface of the base portion, the first connector 1211 and the second connector 1212 includes the surface A of the top portion that extends over the surface of the base portion. During the transportation of the plate, the first and second arms are placed under the first and second connectors to carry the plate holder. For example, the first and second arms may be placed in the space formed by the surface A of the top portion and a vertical surface B of the base portion (where surface A and surface B together define the openings 1411 and 1412), and in contact with the surface A of the top portion and/or the vertical surface B of the base portion. In an embodiment, a side wall 1250 may be further included and together with the surface A and surface B define the first and second openings 1411 and 1412.

Figure 1D:
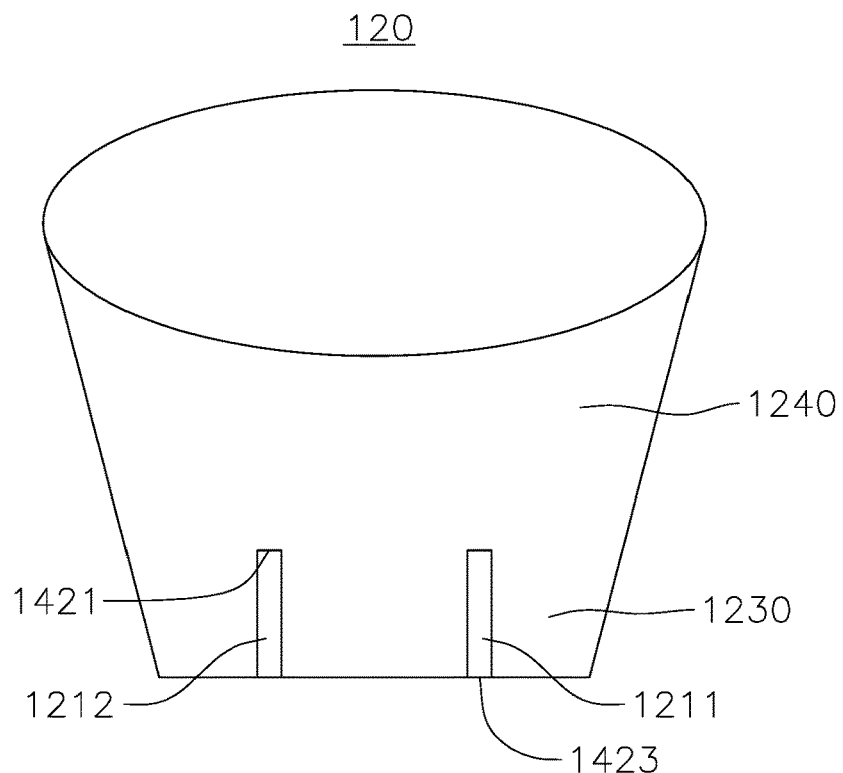

Referring to FIG. 1D, the plate holder 120 has a base portion 1230 and a top portion 1240 on the base portion 1230, the first and second connectors 1211 and 1212 are each an opening (e.g., in a slit shape) 1411 and 1412 extending vertically on the base portion 1230, each opening 1411 and 1412 has a top edge 1421 and optionally a bottom edge 1423 facing the top edge 1421, and the first and second arms are to engage with the top edge of the slit in the extended first lifted position. In one embodiment, the top portion and the base portion of the plate holder may be formed as one integral body.

The side surface, the top portion and the bottom portion may each independently have a curved shaped, a polygonal shape, or a combination of curved and straight features.

Figure 1E:
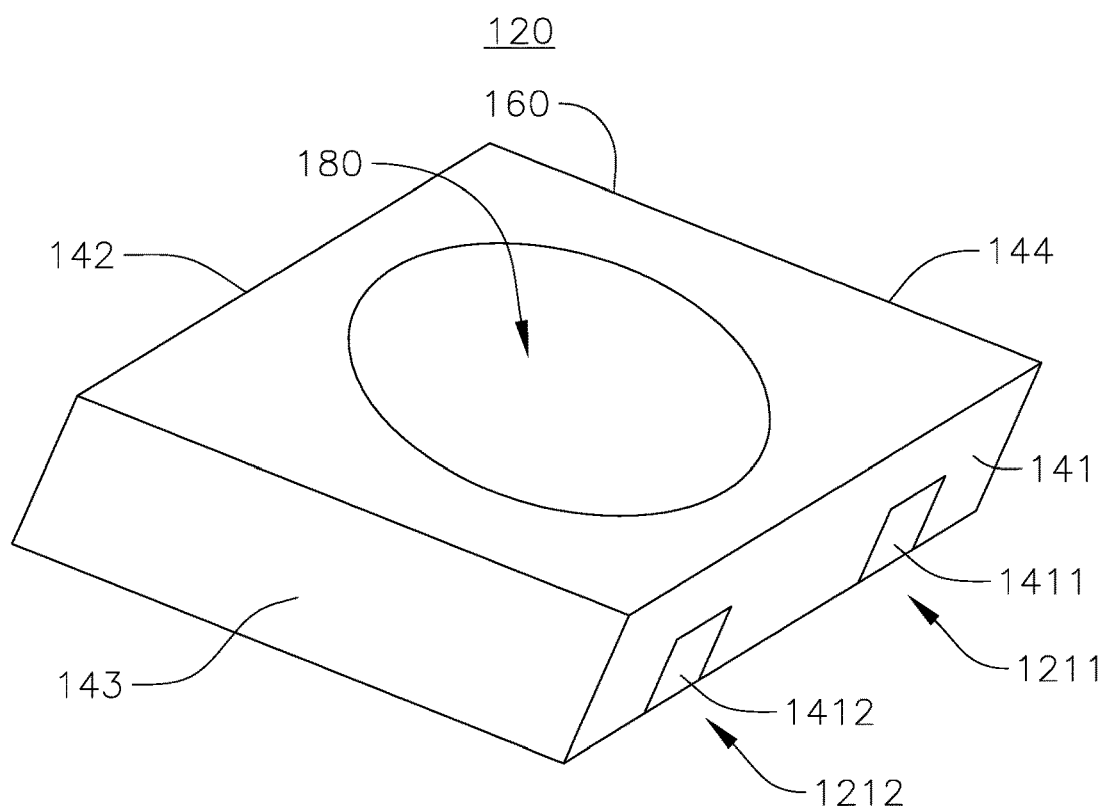

Referring to FIG. 1E, the plate holder may be in the shape of a box and include a first and a second end walls 141 and 142 facing each other, a first and a second side walls 143 and 144 facing each other and each crossing the first and second end walls 141 and 142, and a top cover 160, wherein the first and second end walls 141 and 142, the first and second side walls 143 and 144 and the top cover 160 together define an interior space 180, the first end wall 141 includes a first opening 1411 and a second opening 1412 spaced apart from the first opening 1411, and the first and second openings 1411 and 1412 to accommodate the first and second arms 151 and 153, respectively. The top cover 160 has a concave shape extending toward the interior space 180 to accommodate the plate. In one embodiment, the plate holder may further include a contact bar 1010 in the interior space to engage with the first and second arms 151 and 153 (see FIG. 10).

The first and second openings 1411 and 1412 each may be a slit extending vertically on the first end wall 141, each slit has a top edge closer to the top cover 160 and an optional bottom edge further away from the top cover 160, and the first and second arms 151 and 152 are to engage with the top edge of the slit and/or the contact bar 1010 (e.g., the bottom side of the contact bar) in the extended first lifted position.

In one embodiment, the first and second openings 1411 and 1412 may each have a rectangular shape.

Figure 2A:
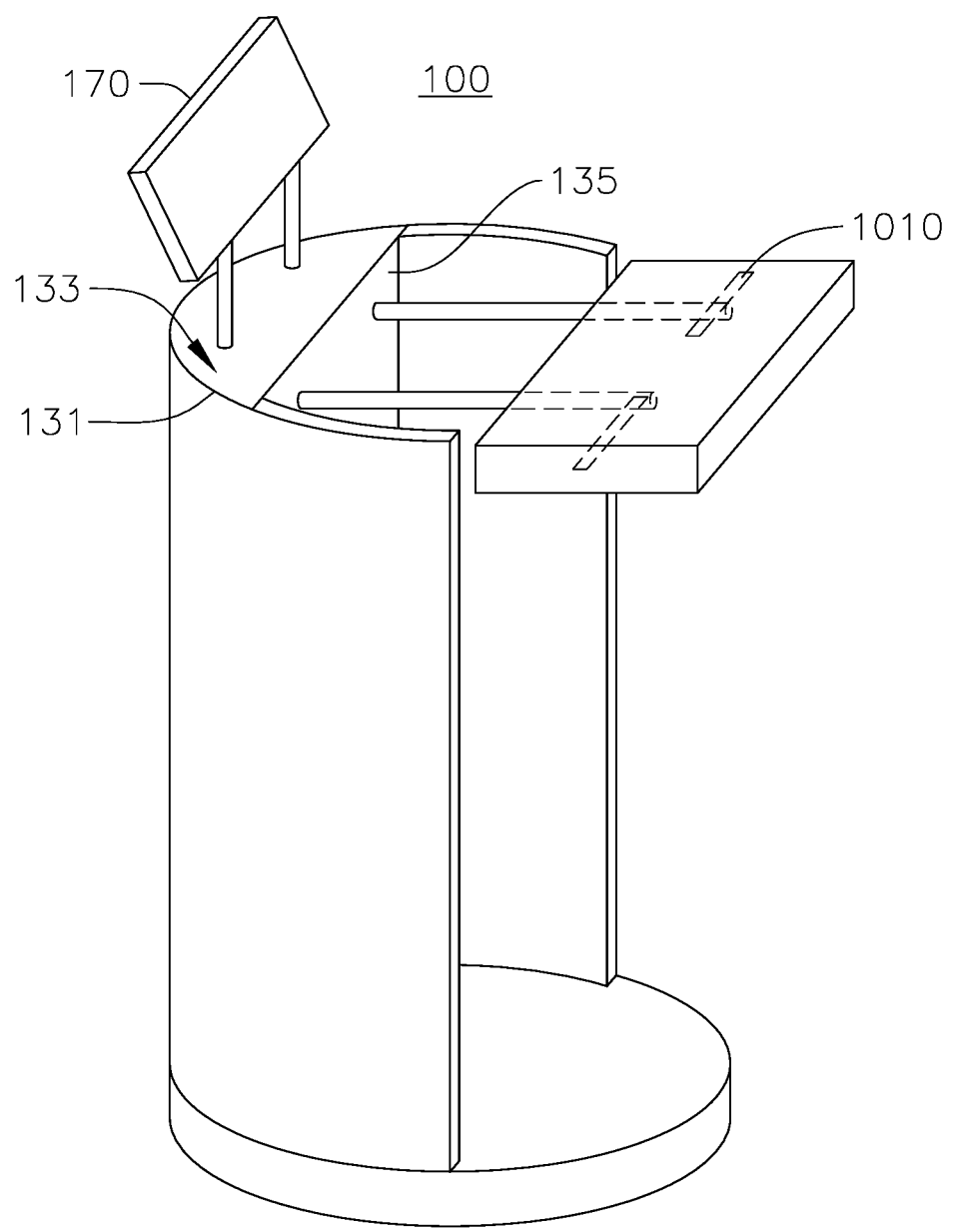
FIGS. 2A and 2B are each a schematic illustration of a system for serving a plate on a table according to an embodiment of the present disclosure.
Figure 2B:
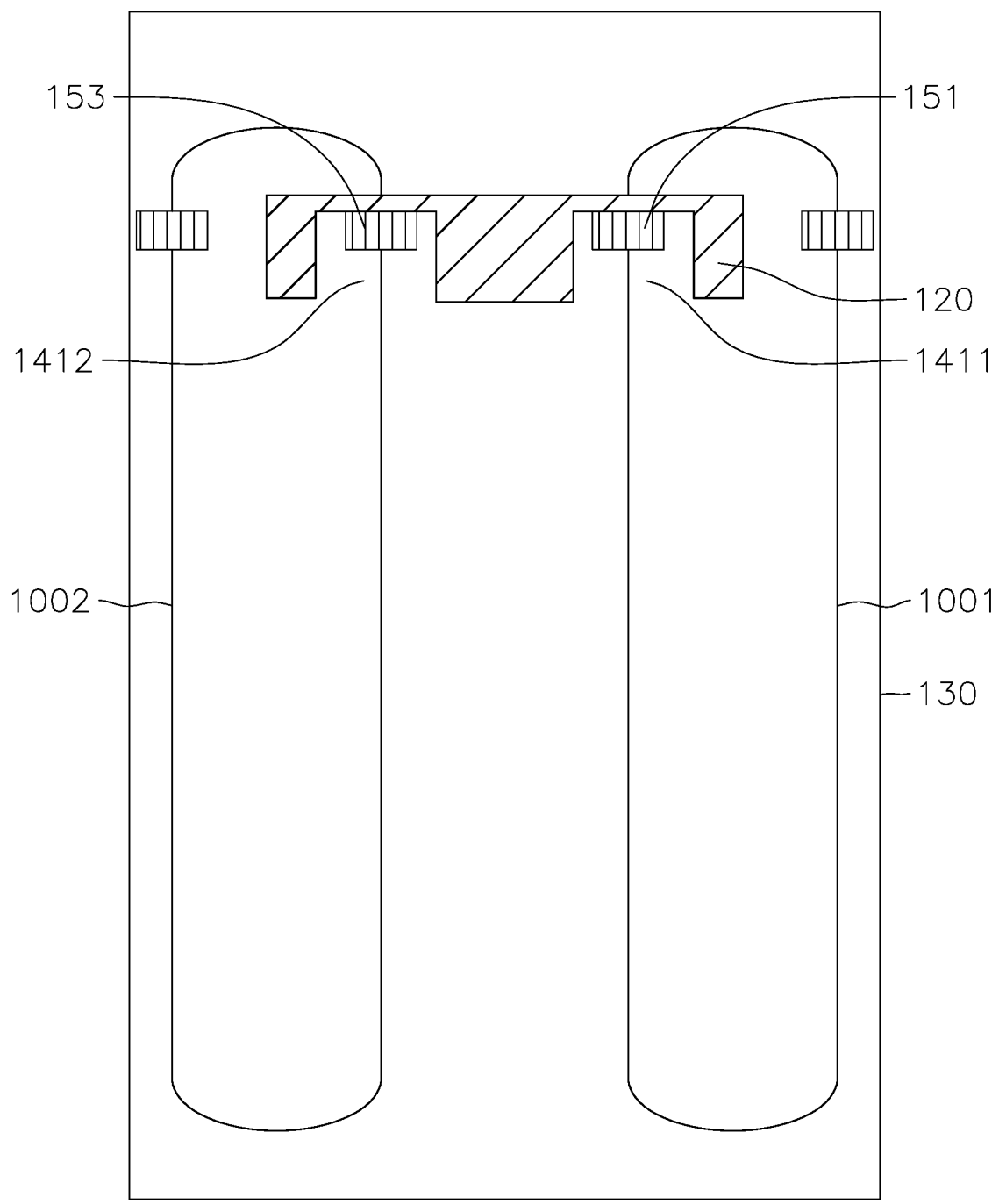

Referring to FIG. 2B, in one embodiment, the first and second arms 151 and 153 may be symmetrical to a center line of the vertical plate 135. The robot may include a first and a second guide rails (or conveyer belts) 1001 and 1002 on the body 130 and each of the first and second arms 151 and 153 may include a first end coupled to the first or the second guide rail and a second end extending outwardly away from the body 130. To engage and lift the plate holder 120, the robot 111 extends and inserts its first and second arms 151 and 153 into the first and second openings 1411 and 1412 of the plate holder 120. The guide rails 1001 and 1002 then concurrently guide and move the first and second arms 151 and 153 in an upward direction to the first lifted position, causing the first and second arms 151 and 153 to engage with the plate holder 120. When engaged, movement in the upward direction to the second lifted position causes the first and second arms 151 and 153 to lift up the plate holder 120. To lower and disengage the plate holder 120, the guide rails 1001 and 1002 of the robot guide the first and second arms 151 and 153 in a downward direction to the first lifted position until the plate holder 120 contacts an upper surface of, e.g., a table. Upon contact, further movement in the downward direction to the lower position causes the first and second arms 151 and 153 to disengage from the plate holder 120. The robot may then retract the first and second arms 151 and 153 out of the openings 1411 and 1412, thereby completing the placing of the plate holder 120 on the upper surface.

Figure 4A:
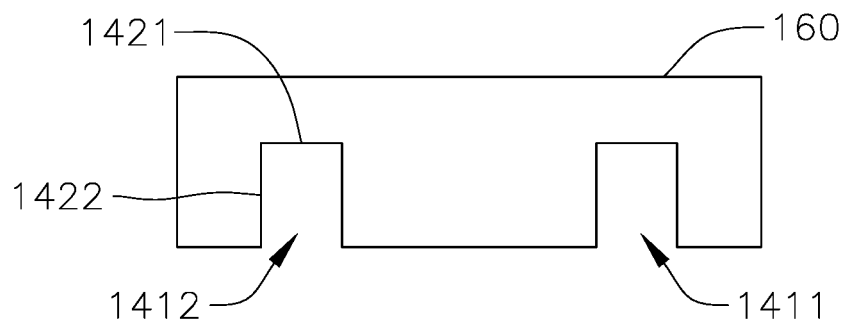
FIG. 4A is a front side view of the plate holder according to an embodiment.

Hereinafter, an example engagement between the robot and the plate holder will be described in more detail with reference to FIGS. 4A-4C. FIG. 4A is a front side view of the plate holder according to an embodiment. Referring to FIG. 4A, the first and second openings 1411 and 1412 may each have a top edge 1421 and two side edges 1422, and without a bottom edge. While the first and second openings 1411 and 1412 have been illustrated as having a rectangle shape, embodiments of the present disclosure are not limited thereto. For example, the first and second openings 1411 and 1412 may have various suitable shapes, such as the shape of a truncated circle with a top edge and two curved side edges, the shape of a trapezoid, square, hexagon, pentagon, circle, etc. While the plate holder has been illustrated in the shape of a box, embodiments of the present disclosure are not limited thereto. For example, as illustrated in FIGS. 1B to 1D, the plate holder may have the shape of a bowl, a round shape, an oval shape, or with a combination of straight faces and curved faces.

Figure 4B:
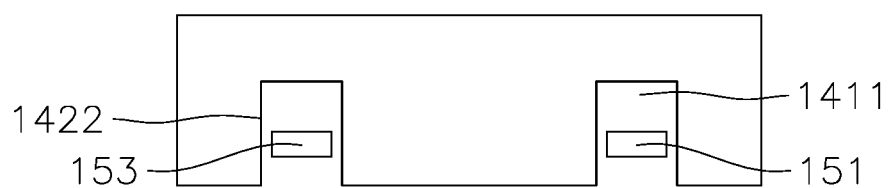
FIG. 4B is a schematic illustration of the first and second arms inserted into the first and second openings in the lower position.
Figure 4C:
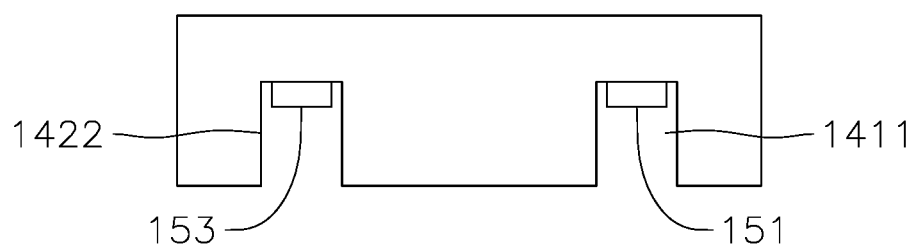
FIG. 4C is a schematic illustration of the first and second arms inserted into the first and second openings in the first lifted position.

FIG. 4B is a schematic illustration of the first and second arms inserted into the first and second openings in the lower position. FIG. 4C is a schematic illustration of the first and second arms inserted into the first and second openings in the first lifted position.

The system may further include a table to receive the plate and a top surface of the table is to contact a bottom surface of the first plate holder when the first and second arms are in the extended first lifted position.

Figure 5:
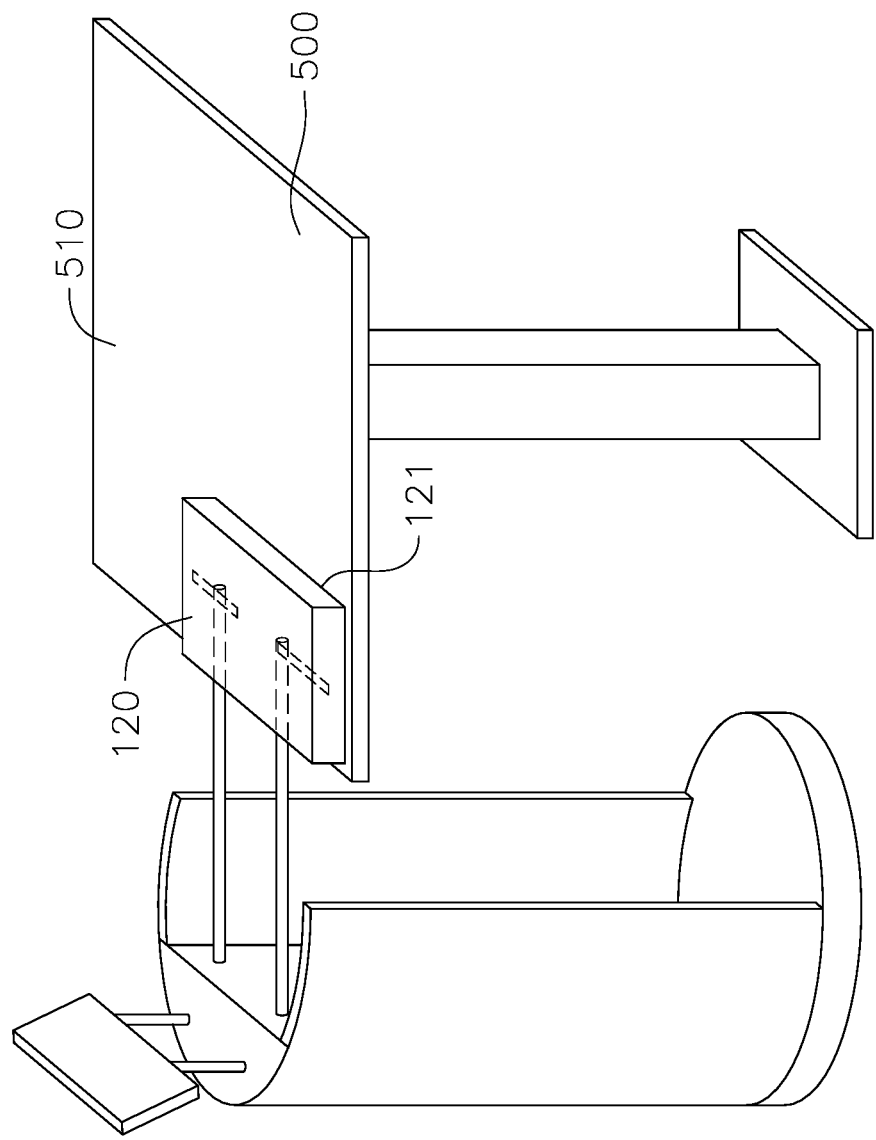
FIG. 5 is a schematic illustration of a robot setting the plate holder on the table.

FIG. 5 is a schematic illustration of setting the plate holder on the table. Referring to FIG. 5, when setting the first plate holder 120 on the table 500, the first pair of arms are in the extended position to reach over the top of the table 500, and the bottom surface 121 of the first plate holder 120 is in contact with the top surface 510 of the table 500.

As illustrated in FIG. 3, a height of the first pair of arms in the extended lower position may be higher than the top surface of the table 500. For example, the height of the first pair of arms in the extended lower position may be at least 0.3 mm, or 0.5 mm to 10 mm, or 0.5 mm to 5 mm, higher than the top surface of the table 500.

As shown in FIG. 1E, the top cover 160 may have a hole in a center thereof. However, embodiments of the present disclosure are not limited thereto. In one embodiment, the top cover 160 has a solid surface with no openings thereon.

The plate holder 120 may further include a bottom cover facing the top cover 160. The bottom cover may be configured to accommodate a heater, and the heater is to heat the dish through the hole of the top cover 160.

As shown in FIG. 1E, the first plate holder 120 may have a rectangular box shape. However, embodiments of the present disclosure are not limited thereto. For example, at least one selected from the first end wall 141, the second end wall 142, the first side wall 143, and the second side wall 144 may have a curved shape.

Referring to FIG. 2A, the body 130 of the robot 111 may include a back plate 131 and together with the vertical plate 135, define a chamber 133.

FIG. 6 is a schematic illustration of a configuration of the first and second arms. Referring to FIG. 6, each of the first and second arms 151 and 153 includes a first segment 1511 and a second segment 1513 connected to the first segment 1511, wherein in the retracted lower position, at least a portion of the first segment 1511 is inside the chamber 133 and the second segment 1513 is outside the chamber 133, and in the extended position, both the first and second segments 1511 and 1513 are outside the chamber 133.

FIG. 7 is a schematic illustration of a configuration of the first and second arms. Referring to FIG. 7, the first and second arms 151 and 153 of the first pair of arms each may include a second segment 1513 having a hollow core and a first segment 1511 connected to the second segment 1513, the first segment 1511 connected to the body 130 of the robot 111. In the retracted lower position, at least a portion of the first segment 1511 is inside the hollow core of the second segment 1513, and in the extended lower position, the first segment 1511 is outside the hollow core of the second segment 1513.

While two segments have been described, embodiments of the present disclosure are not limited thereto. In one embodiment, each of the arms may have three or more segments that at least a portion of which can be folded, bent, or retracted into another portion thereof. In one embodiment, the first and second arms may be formed of a plurality of telescopic segments that can slide over each other to reach the extension and retraction state.

Figure 8A:
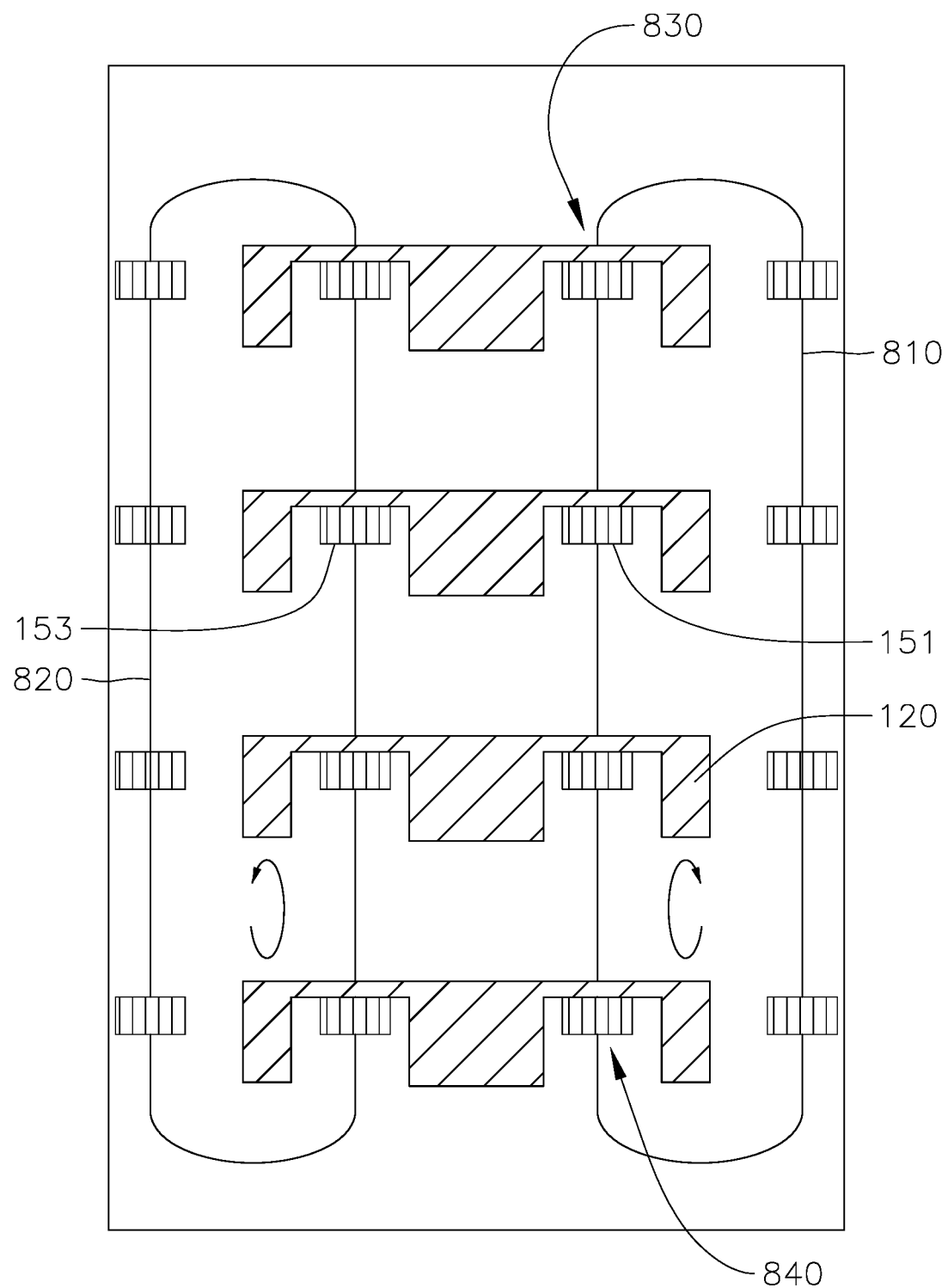
FIGS. 8A and 8B are each a schematic illustration of a system according to an embodiment of the present disclosure.
Figure 8B:
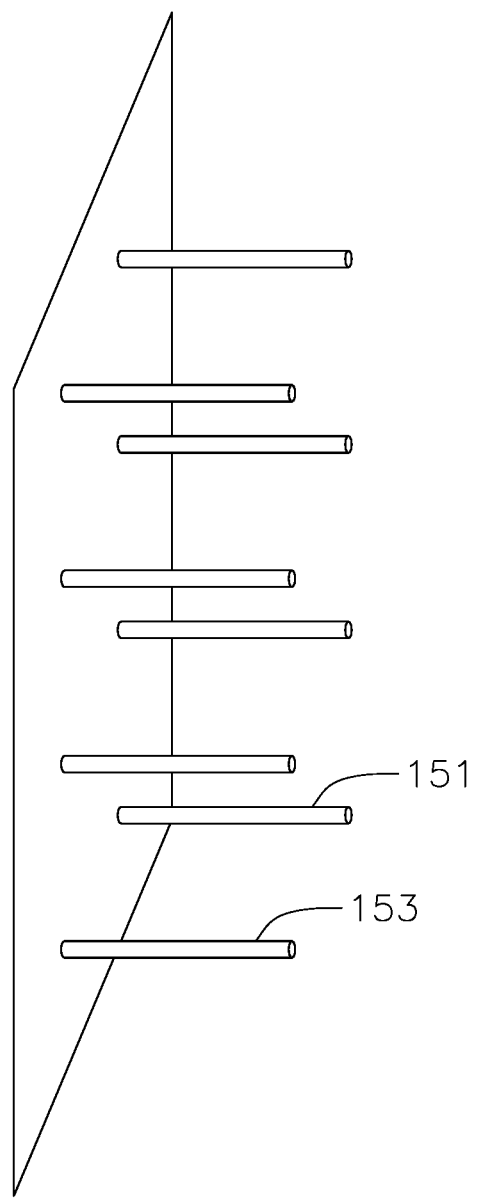

FIGS. 8A and 8B are schematic illustrations of a system according to an embodiment of the present disclosure. The system may include a plurality of the plate holders 120, and the robot may include a plurality of first arms 151 aligned vertically (e.g., Y axis direction) from each other, and a plurality of second arms 153 aligned vertically from each other, each first arm 151 of the plurality of first arms aligned horizontally (e.g., x axis direction) with a corresponding second arm 153 from the plurality of second arms to form a pair of arms and configured to engage with a plate holder 120 of the plurality of plate holders.

The system may further include a first endless conveyer belt 810 connected to each of the plurality of first arms 151 and a second endless conveyer belt 820 spaced apart from the first endless conveyer belt 810, the second endless conveyer belt 820 connected to each of the plurality of second arms 153. The first and second arms 151 and 153 of each pair of arms are to be conveyed between a plurality of positions between a topmost position 830 and a lowermost position 840 vertically.

In one embodiment, each of the first and second endless conveyer belts 810 and 820 is in the shape of a loop having a first long side closer to the center vertical line of the vertical plate 135 and a second long side further away from the center vertical line of the vertical plate 135, and a first end portion and a second end portion near the topmost position 830 and the lowermost position 840 respectively. A plurality of first arms 151 may be uniformly distributed along the length (e.g., the length of the loop) of the first endless conveyer belt 810 and a plurality of second arms 153 may be uniformly distributed along the length of the second endless conveyer belt 820. The first arms 151 along the first long side of the first endless conveyer belt 810 pair with the second arms 153 along the first long side of the second endless conveyer belt 820 to carry plate holders 120. The first arms 151 along the second long side of the first endless conveyer belt 810 and the second arms 153 along the second long side of the second endless conveyer belt 820 are to be paired for carrying plate holders once they are rotated to the first long side of the first and second endless conveyer belts 810 and 820 respectively.

Once a first pair of arms, i.e., the pair of arms on the topmost position 830, finished placing the plate holder it carries on a table, the first and second endless conveyer belts 810 and 820 rotate so such the first and second arms of the first pair of arms are transported from the first long side to a location on the second long side of the respective endless conveyer belt, and a second a pair of arms, i.e., the pair of arms below the first pair of arms, are transported to the topmost position 830 to place a plate holder it carries on a table. Furthermore, the first and second arms near the lowermost position 840 on the second long side of the first and second endless conveyer belts 810 and 820 are transported to the first long side near the lowermost position and are paired to carry a plate holder together. While the vertical movements of the plate holders may be conducted concurrently through the conveyer belts, the retraction and extension of each pair of the arms horizontally may be controlled separately. For example, the retraction and extension of the pair of arms on the top row may be controlled separately from the rest of the pairs of arms.

While four pairs of arms are shown in FIGS. 8A-8B on the first long side of the first and second endless conveyer belts 810 and 820, embodiments of the present disclosure are not limited thereto. The robot may have any suitable number of pairs of arms to carry the plate holders. Accordingly, a plurality of dishes may be carried by the robot in one trip and may be served on the table(s) quickly.

The robot may further include a processor and a display 170. The user may input a position of the table through the display (e.g., a touch sensitive display, or an input pad connected to the display), and the processor is to control movement of the movable base and the pair of arms. The robot may further include sensors to detect obstacles on its route and alert systems for clearing the way.

Figure 9:
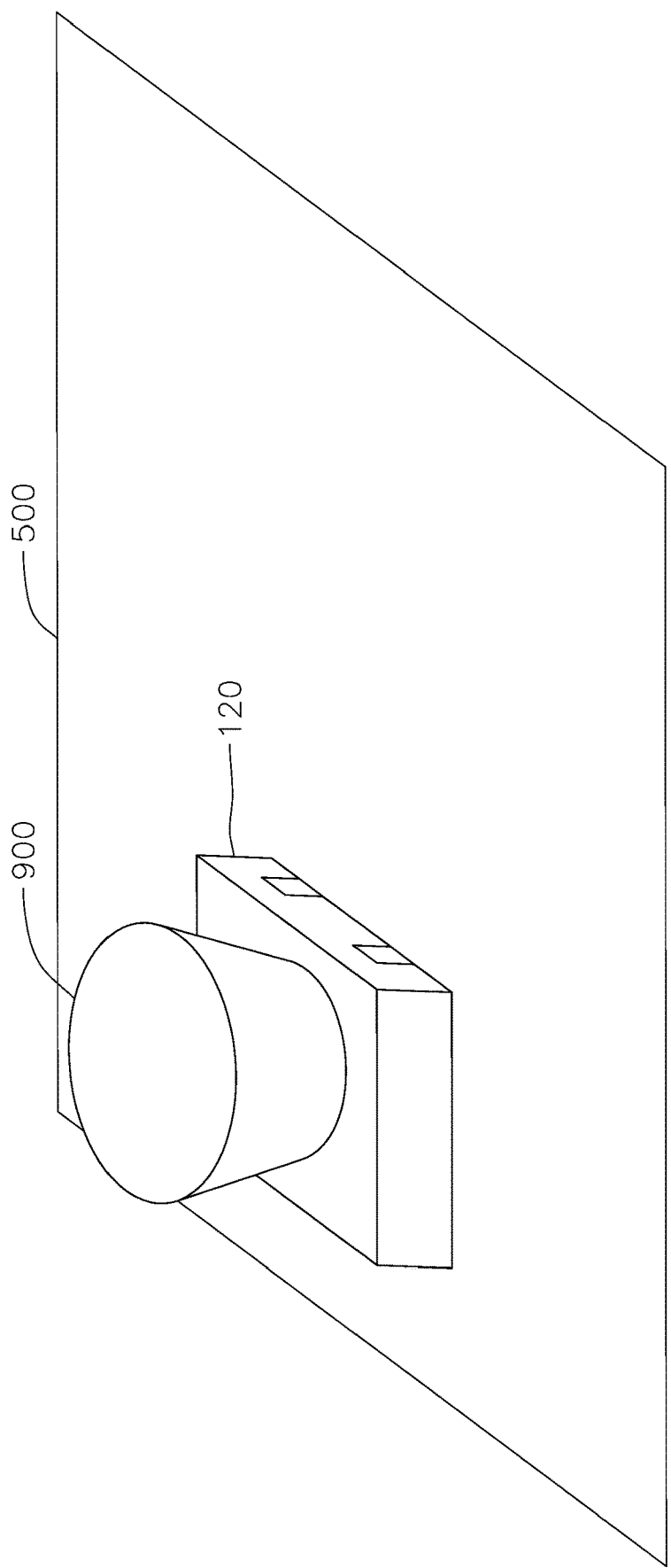
FIG. 9 is a schematic illustration of a plate after it's been served on the table by the robot.

FIG. 9 is a schematic illustration of a plate after it's been served on the table by the robot. Referring to FIG. 9, the plate 900 is placed on the table 500 together with the plate holder 120. That is, the plate holder 120 is not separated from the plate 900 when the plate is placed on the table 500. After placing the plate holder 120 on the table, the robot arms disengage from the plate holder 120.

While FIG. 9 shows a plate holder with a top cover including a circular hole in the center thereof, embodiments of the present disclosure are not limited thereto. The top cover of the plate holder may be variously shaped as long as it can securely hold a plate to be served. For example, the top cover may have a slanted surface towards the center thereof and/or have an elliptical shaped opening at the center thereof. Further, the top cover may have features for receiving the bottom of a plate. In another embodiment, the plate holder may be integrated with the plate and the top cover of the plate holder itself may form the surface to receive the food.

Figure 10:
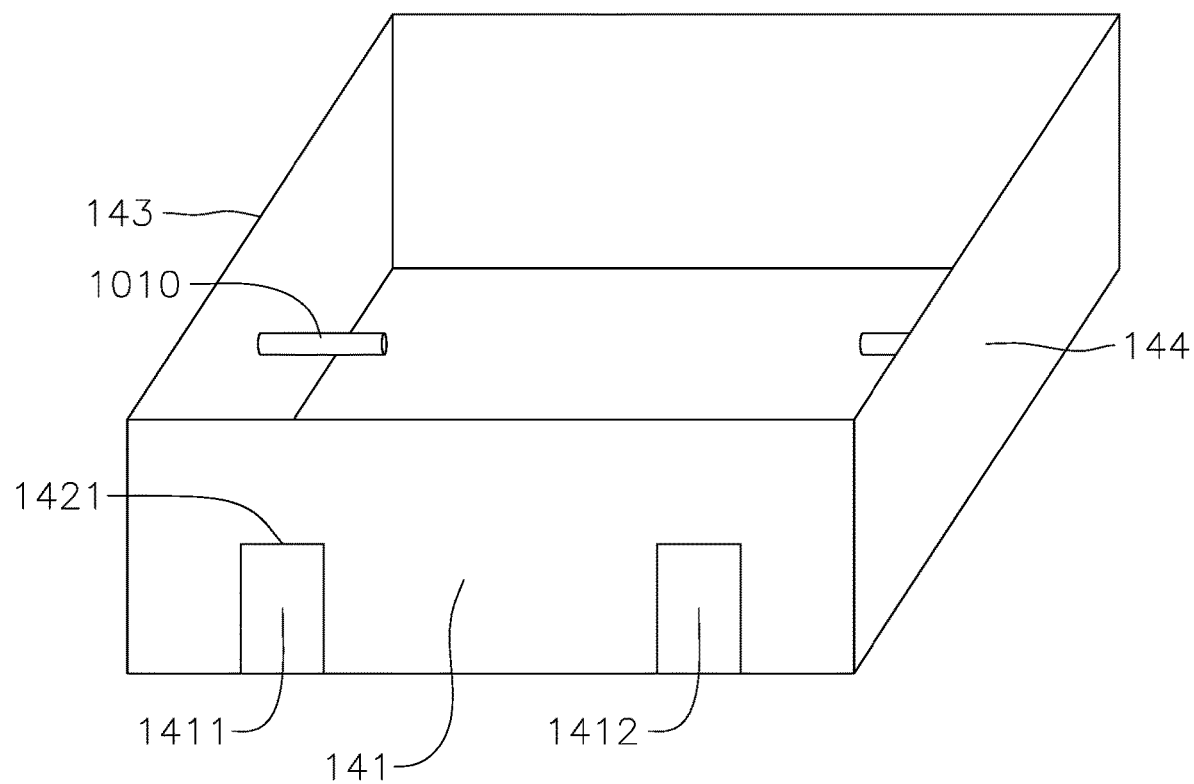
FIG. 10 is a schematic cut-away illustration of a contact bar of the plate holder.

FIG. 10 is a schematic cut-away illustration of a contact bar of the plate holder. Referring to FIG. 10, a contact bar 1010 is attached to each of the first and second side walls 143 and 144 of the plate holder. In the first lifted position, the arms of the robot are in contact with the top edge 1421 of the first and second openings 1411 and 1412 on the first end wall 141 of the plate holder and the contact bars 1010, and hold the plate holder through these contact points. The contact bars may have various suitable sizes and shapes as long as it can cooperate with the upper edge of the first and second openings on the first end wall of the plate holder to enable the robot arms to lift up and carry the plate holder stably. In one embodiment, a portion of the cover plate extends into the interior space and cooperates with the upper edge of the first and second openings on the first end wall of the plate holder to enable the robot arms to lift up and carry the plate holder stably, without an additional contact bar.

While the top edge 1421 of the first and second openings 1411 and 1412 on the first end wall 141 of the plate holder and the contact bars 1010 have been described as contact points with the robot arms, embodiment of the present disclosure are not limited thereto. The robot arms may be engaged and disengaged with the plate holder through various suitable methods. For example, the robot arms may be engaged with the plate holder through magnetization and disengaged though demagnetization of the robot arms.

According to an embodiment of the present disclosure, a method of serving a plate on a table includes moving a robot to a spot adjacent to a table, the robot carrying a plate holder, and the plate holder having the plate thereon, wherein the plate holder includes a first connector and a second connector spaced apart from the first connector; wherein the robot includes a movable base, a body on the movable base, a first pair of arms connected to the body and including a first arm and a second arm spaced apart from the first arm, the first pair of arms configured to complete one or more actions selected from raising, extending, lowering, and withdrawing to reach at least one position selected from a retracted lower position, an extended lower position, an extended first lifted position, an extended second lifted position, and a retracted second lifted position, wherein the first and second arms are engaged with the first and second connectors during the moving of the robot. The method further includes extending the first and second arms to the extended second lifted position, the plate holder over a surface of the table; moving the first and second arms to the extended first lifted position, the plate holder being placed on the table; moving the first and second arms to the extended lower position to disengage from the first and second connectors; and retracting the first and second arms to the retracted lower position.

Figure 11:
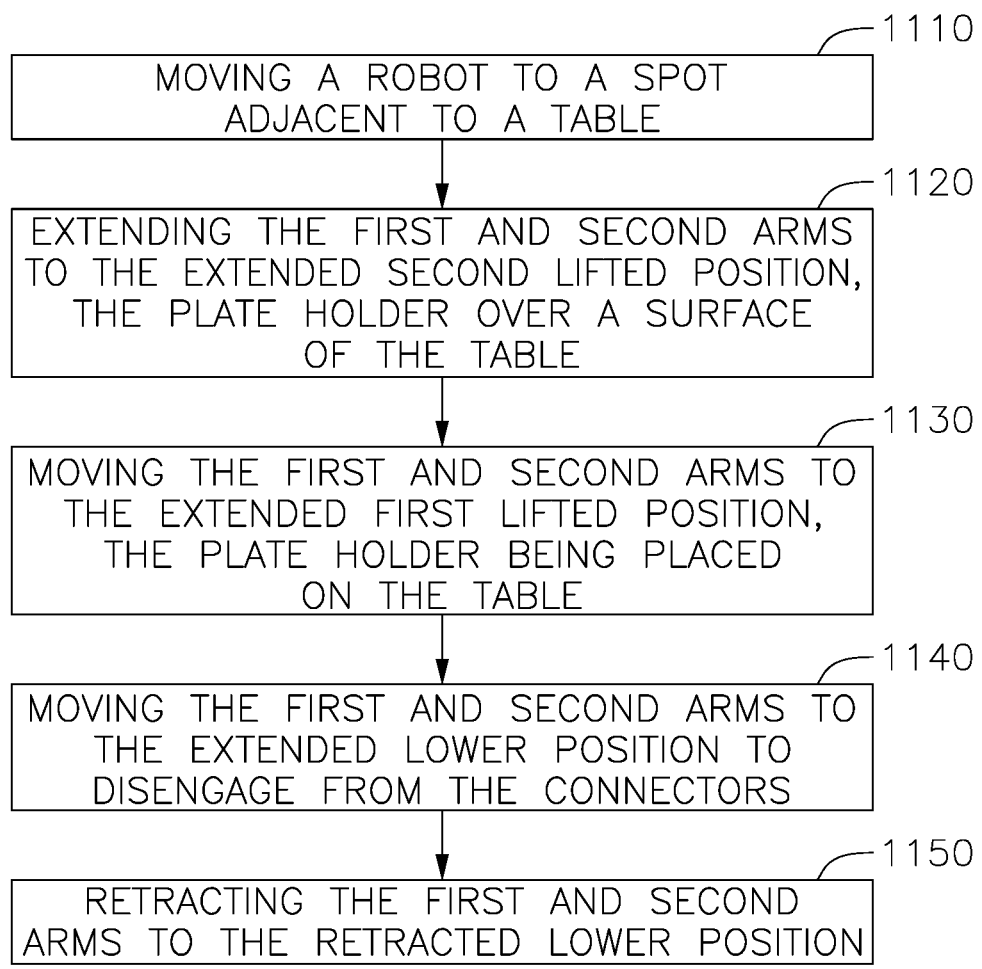
FIG. 11 is a flow chart illustration a method of serving a plate on a table according to an embodiment of the present disclosure.

FIG. 11 is a flow chart illustration a method of serving a plate on a table according to an embodiment of the present disclosure. Referring to FIG. 11, the method includes moving a robot to a spot adjacent to a table in act 1110. The robot carries a plate holder, and the plate holder has the plate thereon or the plate holder is integrated with the plate as one body. The plate holder and the robot are as described above and a detailed description will not be repeated. The distance between the robot and the table is a set or predetermined value such that the robot does not bump into the table and the robot arms may reach over the top of the table when in the extended position.

The method further includes extending the first and second arms of the robot to the extended second lifted position to put the plate holder over a surface of the table in act 1120; moving the first and second arms to the extended first lifted position to place the plate holder on the table in act 1130; moving the first and second arms to the extended lower position to disengage from the connectors in act 1140, and retracting the first and second arms to the retracted lower position in act 1150. When extending the first and second arms of the robot to the extended second lifted position to put the plate holder over a surface of the table in act 1120, the bottom surface of the plate holder is higher than the top surface of the table by a set or predetermined value such that the plate holder can be located above the top surface of the table without bumping into the table. When moving the first and second arms to the extended first lifted position to place the plate holder on the table in act 1130, the bottom surface of the plate holder just touches the top surface of the table and the plate holder sits on the table. Here, the first lifted position is lower than the second lifted position in the vertical direction. Once the plate holder is placed on the table, the first and second arms are moved to the extended lower position to disengage from the first and second connectors (and/or the upper edge of the openings of the first end wall of the plate holder) in act 1140. At this point, the first and second arms of the robot do not contact any part of the plate holder. Finally, the first and second arms are retracted out of the interior space of plate holder to the retracted lower position in act 1150. The robot may move back to the kitchen to pick up another dish, or may continue serving other dishes it carries, an embodiment to be discussed in more detail later.

The retracting, extending, lifting and lowering of the robot arms may be controlled by a processor and delivered by any suitable methods available in the comparable art. For example, each of the first and second arms may include a first segment and a second segment connected to the first segment. To reach the retracted position, at least a portion of the first segment may be withdrawn to be inside the chamber of the robot body and the second segment may be left outside the chamber. To reach the extended position, the first segment may be moved outside the chamber, which pushes the second segment to be further away from the body of the robot.

In another embodiment, the first and second arms each may include a second segment having a hollow core and a first segment connected to the second segment, with the first segment connected to the body of the robot. To reach the retracted position, the second segment may be withdrawn toward the body of the robot such that at least a portion of the first segment is inside the hollow core of the second segment. To reach the extended position, the second segment may be pushed away from the body of the robot such that the first segment is outside the hollow core of the second segment.

The up and down movement of the robot arms may be achieved through any suitable methods available in the comparable art, such as a conveyer or a guide rail.

While moving the first and second arms to the extended first lifted position to place the plate holder on the table in act 1130 and moving the first and second arms to the extended lower position to disengage from the contact bar in act 1140 have been described in two acts, embodiments of the present disclosure are not limited thereto. In one embodiment, moving the first and second arms to the extended first lifted position to place the plate holder on the table and moving the first and second arms to the extended lower position to disengage from the contact bar are conducted in one continuous downward movement of the first and second arms.

While extending the first and second arms of the robot to the extended second lifted position to put the plate holder over a surface of the table in act 1120; moving the first and second arms to the extended first lifted position to place the plate holder on the table in act 1130; moving the first and second arms to the extended lower position to disengage from the contact bar in act 1140, and retracting the first and second arms to the retracted lower position in act 1150 have been described in separate acts, embodiments of the present disclosure are not limited thereto. For example, these acts may be conducted continuously without any pause in the movement of the arms. That is, the extending of the first and second arms of the robot to the extended second lifted position to put the plate holder over a surface of the table; moving the first and second arms to the extended first lifted position to place the plate holder on the table; moving the first and second arms to the extended lower position to disengage from the contact bar, and retracting the first and second arms to the retracted lower position may be conducted in one continuously act.

The method may further include prior to the moving of the robot, picking up the plate holder from the kitchen. The picking up of the plate holder includes: moving the first and second arms into the extended lower position, the first and second arms inserted into the first and second openings of the plate holder in the extended position, moving the first and second arms to the extended first lifted position to engage with the contact bar of the plate holder, moving the first and second arms to the extended second lifted position, the plate holder being held horizontally by the first and second arms, retracting the first and second arms to the retracted second lifted position.

Figure 12:
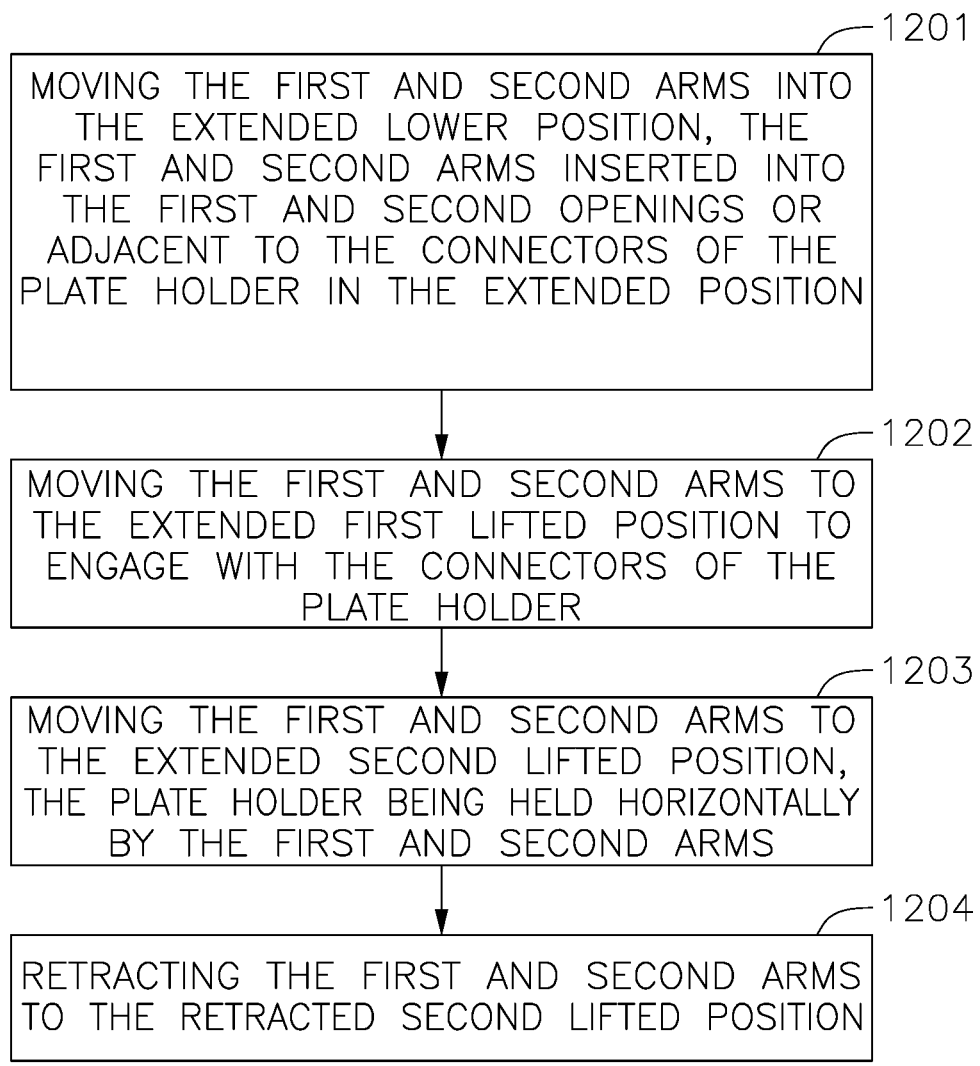
FIG. 12 is a flow chart schematically illustrating a method of picking up a plate holder.

FIG. 12 is a flow chart schematically illustrating a method of picking up a plate holder. Referring to FIG. 12, the method for picking up the plate holder which has a plate of food thereon from the kitchen includes: moving the first and second arms into the extended lower position, the first and second arms inserted into the first and second openings or adjacent to the first and second connectors of the plate holder in the extended position in act 1201. At this point, the first and second arms are not in contact with any parts of the plate holder while a portion of the arms may be inside the interior space of the plate holder or may be adjacent to the connectors on the side surface of the plate holder. The method further includes moving the first and second arms to the extended first lifted position to engage with the connectors (and/or the upper edge of the openings in the first end wall) of the plate holder in act 1202, moving the first and second arms to the extended second lifted position, where the plate holder being held horizontally by the first and second arms in act 1203. Here, the plate holder is lifted from the table because the second lifted position is higher than the first lifted position in the vertical direction. The method further includes retracting the first and second arms to the retracted second lifted position in act 1204. After the first and second arms are retracted to be closer to the body of the robot, the robot may start moving towards the table the plate is meant for. With the plate holder held closer to the body of the robot in the retracted position of the arms, the plate holder may be transported more steadily and smoothly, and also avoid bumping into other object or people during the movement of the robot.

In another embodiment, the plate holder and the plate thereon may be placed on the first and second arms by a kitchen staff while the first and second arms are in the retracted second lifted position. The kitchen staff may then input the location of the table and the spot on the table through the display and initiate the movement of the robot.

The location of the tables and the floor layout of the restaurants may be mapped out and the route to reach each table may be saved in the processor of the robot. Further, the tables of the restaurant may be free of items prior to the delivery of the plates by the robot. In addition, while plates have been described in the example embodiments, embodiments of the present disclosure are not limited thereto. For example, the plate holder may carry the plate, pots, utensils, napkins, drinks, and/or condiments.

In one embodiment, the robot may include a plurality of first arms aligned vertically from each other, and a plurality of second arms aligned vertically from each other, each first arm of the plurality of first arms aligned horizontally with a corresponding second arm from the plurality of second arms to form a pair of arms and configured to engage with a plate holder of a plurality of plate holders.

The robot may further include a first endless conveyer belt connected to each of the plurality of first arms and a second endless conveyer belt spaced apart from the first endless conveyer belt, the second endless conveyer belt connected to each of the plurality of second arms, and the method further includes moving a pair of arms from a topmost position to a lowermost position vertically after the retracting of the first and second arms of the pair of arms.

Referring to FIG. 8, the first and second arms 151 and 153 of each pair of arms are to be conveyed between a plurality of positions between a topmost position 830 and a lowermost position 840 vertically. When the pair of arms on the topmost position 830 finished placing the plate holder it carries on a table, the first and second endless conveyer belts 810 and 820 rotate so such the first and second arms of the first pair of arms are transported from the first long side to a location on the second long side of the respective endless conveyer belt, and a second a pair of arms, i.e., the pair of arms below the first pair of arms are transported to the topmost position 830 to place a plate holder it carries on a table. Furthermore, the first and second arms near the lowermost position 840 on the second long side of the first and second endless conveyer belts 810 and 820 are transported to the first long side near the lowermost position and are paired to carry a plate holder together. While the vertical movements of the plate holders may be conducted concurrently through the conveyer belts, the retraction and extension of each pair of the arms horizontally may be controlled separately. For example, the retraction and extension of the pair of arms on the top row may be controlled separately from the rest of the pairs of arms.

The robot may further include a speaker, and the method further includes announcing a message prior to extending the first and second arms to the extended second lifted position.

Figure 13:
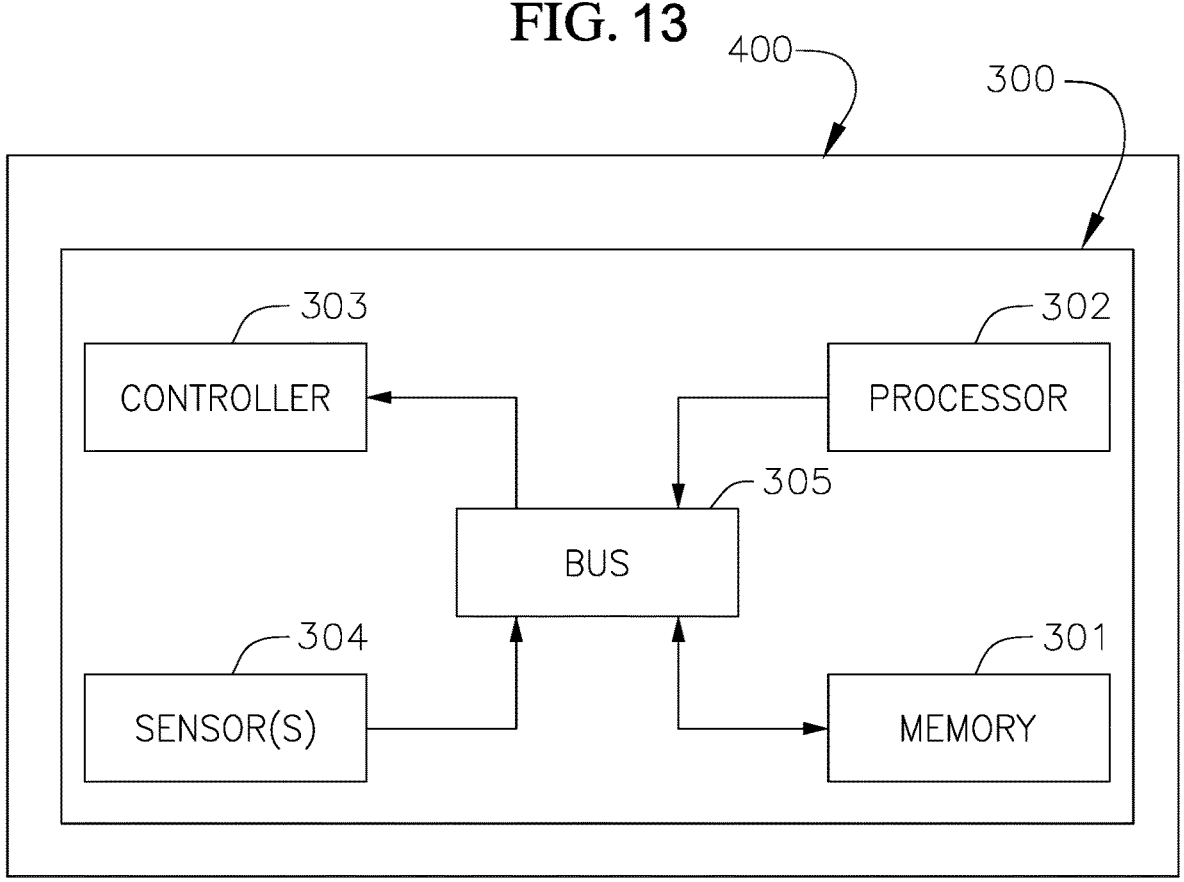
FIG. 13 is a block diagram of an electrical/automation system incorporated into a robot or robotic service system.

FIG. 13 is a block diagram of an electrical/automation system 300 incorporated into a robot or robotic service system 400, according to embodiments of the present disclosure. The electrical/automation system 300 may be configured to control, at least in part, the system 400 into which the electrical/automation system 300 is incorporated.

In the illustrated embodiment, the electrical/automation system 300 includes a memory device 301 (e.g., non-volatile memory, such as read-only memory ("ROM"), programmable ROM ("PROM"), erasable programmable ROM ("EPROM"), electrically erasable programmable ROM "EEPROM"), flash memory, etc.), a processor or a processing circuit 302, a controller 303, and at least one sensor 304. The memory device 301, the processor or processing circuit 302, the controller 303, and the at least one sensor 304 may communicate with each other over a system bus 305. In one or more embodiments in which the electrical/automation system 300 is configured to control the robot or robotic service system 400, the sensors 304 may be any suitable type or kind of sensors configured to detect objects or situations in a path of the robot, such as one or more cameras and/or radars, and the controller 303 may be connected to any suitable robotic components for controlling the robot based on the objects or situations detected by the one or more sensors 304.

In one or more embodiments, the memory device 301 is programmed with instructions which, when executed by the processor or processing circuit 302, cause the processor or processing circuit 302 to perform each of the tasks described above with reference to the flowchart depicted in FIGS. 11 and 12. Alternatively, the processor or processing circuit 302 may be configured to execute instructions retrieved from an online data storage unit such as in "Cloud" computing and the online data storage unit.

Additionally, in one or more embodiments, the memory device 301 or the online data storage unit is programmed with instructions which, when executed by the processor or processing circuit 302, cause the processor or processing circuit 302 to calculate, determine, and/or perform the tasks of the system 400 as depicted in FIGS. 1-10.

In one or more embodiments, the memory device 301 or the online data storage unit is programmed with instructions which, when executed by the processor or processing circuit 302, cause the processor or processing circuit 302 to operate the controller 303 to control the system 400 in which electrical/automation system 300 is incorporated in accordance with the tasks that the system 400 is to perform. For instance, in one or more embodiments in which the electrical/automation system 300 is incorporated into a robot (i.e., the system 400 is a robotic service system), the instructions may cause the processor or processing circuit 302 to actuate the controller 303 to control the steering, braking, accelerating, lifting, lowering, extending and/or retracting of the arms of the robot and/or steering, braking, and/or accelerating of the movable base (e.g., to serve an item to a restaurant customer and/or avoid one or more hazardous objects or conditions captured by the one or more sensors 304).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof.

What is claimed is:

1. A system for serving a plate on a table, comprising:
a robot comprising a movable base, a body on the movable base, and a first pair of arms connected to the body and comprising a first arm and a second arm spaced apart from the first arm, the first pair of arms configured to complete one or more actions of raising, extending, lowering, and withdrawing to reach at least one position selected from a retracted lower position, an extended lower position, an extended first lifted position, an extended second lifted position, and a retracted second lifted position; and
a first plate holder comprising a first connector and a second connector spaced apart from the first connector, the first connector and the second connector to engage the first arm and the second arm, respectively,
wherein the system further comprises:
a plurality of plate holders;
the robot further comprises a plurality pairs of arms comprising a plurality of first arms and a plurality of second arms, each pair of arms comprising a first arm aligned vertically with other first arms, and a second arm aligned vertically with other second arms, each pair of arms configured to engage with a plate holder of the plurality of plate holders; and
a first endless conveyer belt connected to each of the plurality of first arms and a second endless conveyer belt spaced apart from the first endless conveyer belt, the second endless conveyer belt connected to each of the plurality of second arms, and
wherein each pair of arms is to be conveyed between a plurality of positions between a topmost position and a lowermost position vertically.

2. The system of claim 1, wherein the first connector and the second connector each have an opening to accommodate the respective first arm and the second arm.

3. The system of claim 1, wherein the first connector and the second connector each have a top edge to engage with the respective first arm and the second arm.

4. The system of claim 1, wherein
the first plate holder has a base portion and a top portion on the base portion,
the first connector and the second connector are each an opening extending vertically on the base portion, each opening has a top edge, and
the first arm and the second arm are to engage with the top edge of the respective opening in the extended first lifted position.

5. The system of claim 1, wherein
the first plate holder and a corresponding plate are integrally formed together, and
the first plate holder has an upper surface defining an interior of the corresponding plate to receive food.

6. The system of claim 1, further comprising a table to receive the plate, wherein a top surface of the table has substantially the same height as a bottom surface of the first plate holder when the first arm and the second arm are in the extended first lifted position.

7. The system of claim 6, wherein a height of the first pair of arms in the extended lower position is higher than the top surface of the table.

8. The system of claim 1, wherein the first plate holder has a rectangular box shape.

9. The system of claim 1, wherein at least a portion of the first plate holder has a curved shape.

10. The system of claim 1, wherein
the body has a chamber surrounded by a vertical plate and a back plate, and
each of the first arm and the second arm comprises a first segment and a second segment connected to the first segment, wherein in the retracted lower position, the first segment is inside the chamber and the second segment is outside the chamber, and in the extended lower position, both the first and the second segments are outside the chamber.

11. The system of claim 1,
wherein the first arm and the second arm each comprise a second segment having a hollow core and a first segment between the second segment and the body of the robot, and
wherein in the retracted lower position, at least a portion of the first segment is inside the hollow core of the second segment, and in the extended lower position, the first segment is outside the hollow core of the second segment.

12. The system of claim 1, wherein the robot further comprises a processor and a display, wherein a user is to input a position of the table through the display, and the processor is to control movement of the movable base and the first pair of arms.

13. A method of serving a plate on a table, comprising:
moving a robot to a spot adjacent to the table, the robot carrying a first plate holder, and the first plate holder having a first plate thereon, wherein the first plate holder comprises a first connector and a second connector spaced apart from the first connector, wherein the robot comprises a movable base, a body on the movable base, and a first pair of arms connected to the body and comprising a first arm and a second arm spaced apart from the first arm, the first pair of arms configured to complete one or more actions of raising, extending, lowering, and withdrawing to reach at least one position selected from a retracted lower position, an extended lower position, an extended first lifted position, an extended second lifted position, and a retracted second lifted position, wherein the first arm and the second arm are engaged with the first connector and the second connector during the moving of the robot;

extending the first arm and the second arm to the extended second lifted position, the first plate holder over a surface of the table;

moving the first arm and the second arm to the extended first lifted position, the first plate holder being placed on the table;

moving the first arm and the second arm to the extended lower position to disengage from the first connector and the second connector; and retracting the first arm and the second arm to the retracted lower position, wherein the robot further comprises a plurality pairs of arms comprising a plurality of first arms and a plurality of second arms, each pair of arms comprising a first arm aligned vertically with other first arms, and a second arm aligned vertically with other second arms, each pair of arms configured to engage with a plate holder of a plurality of plate holders, and wherein the robot further comprises a first endless conveyer belt connected to each of the plurality of first arms and a second endless conveyer belt spaced apart from the first endless conveyer belt, the second endless conveyer belt connected to each of the plurality of second arms.

14. The method of claim 13, wherein the first plate holder has a base portion and a top portion on the base portion, the first connector and the second connector are each an opening extending vertically on the base portion, each opening has a top edge, and the first arm and the second arm are to engage with the top edge of the respective opening in the extended first lifted position.

15. The method of claim 13, wherein the first plate holder and the first plate are integrally formed together, and the first plate holder has an upper surface defining an interior of the first plate to receive food.

16. The method of claim 13, further comprising prior to the moving of the robot, picking up the first plate holder, wherein the picking up of the first plate holder comprises:

moving the first arm and the second arm into the extended lower position, the first arm and the second arm adjacent to or inside the first connector and the second connector of the first plate holder in the extended lower position, moving the first arm and the second arm to the extended first lifted position to engage with the first connector and the second connector of the first plate holder, moving the first arm and the second arm to the extended second lifted position, the first plate holder being held horizontally by the first arm and the second arm, and retracting the first arm and the second arm to the retracted second lifted position.

17. The method of claim 13, wherein each of the first and second endless conveyer belts have a first long side closer to a center of the body, and a second long side further away from the center of the body, wherein the method further comprises after retracting the first arm and the second arm of a topmost pair of arms of the plurality pairs of arms in a topmost position to the retracted lower position, moving the first arm and the second arm of the topmost pair of arms to the second long side of the respective first and second endless conveyer belts, and moving a second pair of arms under the topmost pair of arms to the topmost position.

18. The method of claim 13, wherein the robot further comprises a speaker, and the method further comprises announcing a message prior to extending the first arm and the second arm to the extended second lifted position.

* * * * *